United States Patent [19]

Lauterbach

[11] 3,982,866

[45] Sept. 28, 1976

[54] DEVICE FOR ALIGNMENT OF BRIQUETTE ROLLS

[75] Inventor: William L. Lauterbach, Upper St. Clair Township, Allegheny County, Pa.

[73] Assignee: United States Steel Corporation, Pittsburgh, Pa.

[22] Filed: Apr. 4, 1975

[21] Appl. No.: 565,317

Related U.S. Application Data

[62] Division of Ser. No. 442,293, Feb. 13, 1974, Pat. No. 3,909,079.

[52] U.S. Cl. .................... 425/168; 425/237; 425/363; 308/3 R; 248/274; 308/3.9

[51] Int. Cl.[2] .................... F16C 25/00

[58] Field of Search .......... 425/237, 363, 168, 335, 425/471; 19/261; 29/110; 308/3.9, 3 R, 121, 31; 248/274

[56] References Cited

UNITED STATES PATENTS

| | | | |
|---|---|---|---|
| 844,330 | 2/1907 | Cole | 425/237 X |
| 1,979,004 | 10/1934 | McCrohan | 425/363 X |
| 2,575,590 | 11/1951 | Goulding, Jr. | 425/363 X |
| 2,621,364 | 12/1952 | Stillman | 425/237 X |
| 2,814,260 | 11/1957 | Morgan | 425/363 X |
| 2,818,904 | 1/1958 | Ambrose | 425/363 X |
| 3,608,147 | 9/1971 | Galonska | 425/363 X |

*Primary Examiner*—Robert L. Spicer, Jr.
*Attorney, Agent, or Firm*—William L. Krayer

[57] ABSTRACT

The rolls of tandem roll briquette molding machines are conveniently aligned and oriented with each other with the use of a novel adjustable bearing block. It permits axial adjustment of rolls weighing several tons within tolerances of very small dimensions.

4 Claims, 3 Drawing Figures

DEVICE FOR ALIGNMENT OF BRIQUETTE ROLLS

Figure 1:
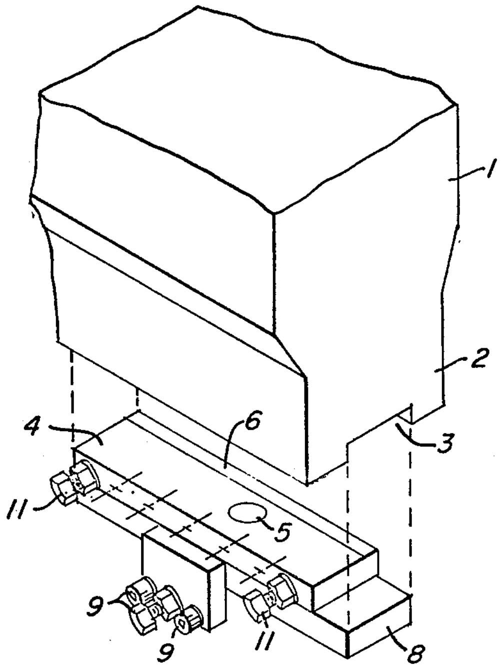

This is a division, of application Ser. No. 442,293, filed Feb. 13, 1974, now U.S. Pat. No. 3,909,079.

BACKGROUND OF THE INVENTION

This invention relates to machines for making briquettes in molds mounted on tandem rolls such as are described in Komarek U.S. Pat. No. 3,077,634. Komarek shows a briquetting machine characterized by a cylindrical central body having V-shaped recesses for accommodating mold inserts. These cylindrical units are placed in tandem so that faces of two molds oppose each other as the cylinders turn, compressing the particulate material which falls between them. Temperatures of the gas are about 1100°–1400°F. A continuous ore feeding operation requires that a screw feeder constantly force the hot ore into the bottom of a bowl or other tapered device for direction into the nip of the rolls. The pressures and temperatures of the screw feeding operation are necessarily severe and result in considerable wear and tear of the feeder and associated equipment.

It is important that the rolls and their respective pockets line up both circumferentially as well as axially.

Although the roll assemblies are supported on two bearing blocks, good design dictates that the rolls be positioned axially by fixing only one bearing block and allowing the other block to float. In most briquetting machines, the fixed bearing block is the one opposite the drive end.

In addition to fixing the rolls axially, the bearing blocks must be free to pivot in the horizontal plane in order to prevent roll breakage because of the high separating forces generated during the briquetting operation. Conventionally, this is accomplished by fitting a guide block in a slot on the underside of the fixed bearing block and then by locating this guide block with a guide pin which positions the block and corresponding roll assembly in the briquette machine frame.

It has been extremely difficult with the prior art configuration to move the rolls, weighing six or more tons, to within a very close tolerance of roll gap and axial alignment, generally without being able to see the bearing block or the adjustment for it, which is obscured by the massive machinery. A critical problem in the prior art configuration was that the roll and its housing had to be lowered into a perfectly level position on the bearing block.

SUMMARY OF THE INVENTION

This invention relates to means for adjusting the position of a mold roll in a mold roll briquetting machine. In particular it relates to an adjustable guide device situated underneath the end of a heavy roll.

My invention includes an adjustable guide device for a roll-type briquetting machine comprising (a) a substantially horizontal mounting plate having means for horizontal adjustment, (b) a guide block on said mounting plate, having a substantially horizontal surface and a guide edge for alignment substantially perpendicular to the axis of a mold roll, (c) a vertical pin having threads for engagement with and through said mounting plate and an unthreaded extension for passing through said guide block, (d) a gib substantially parallel to said guide block and situated substantially adjacent to the guide edge thereof, and (e) means for adjusting the position of said gib with respect to the guide edge of guide block. It also includes combination of the device just described with a mold roll fitted with bearing blocks, and with a machine frame including a base.

Figure 2:
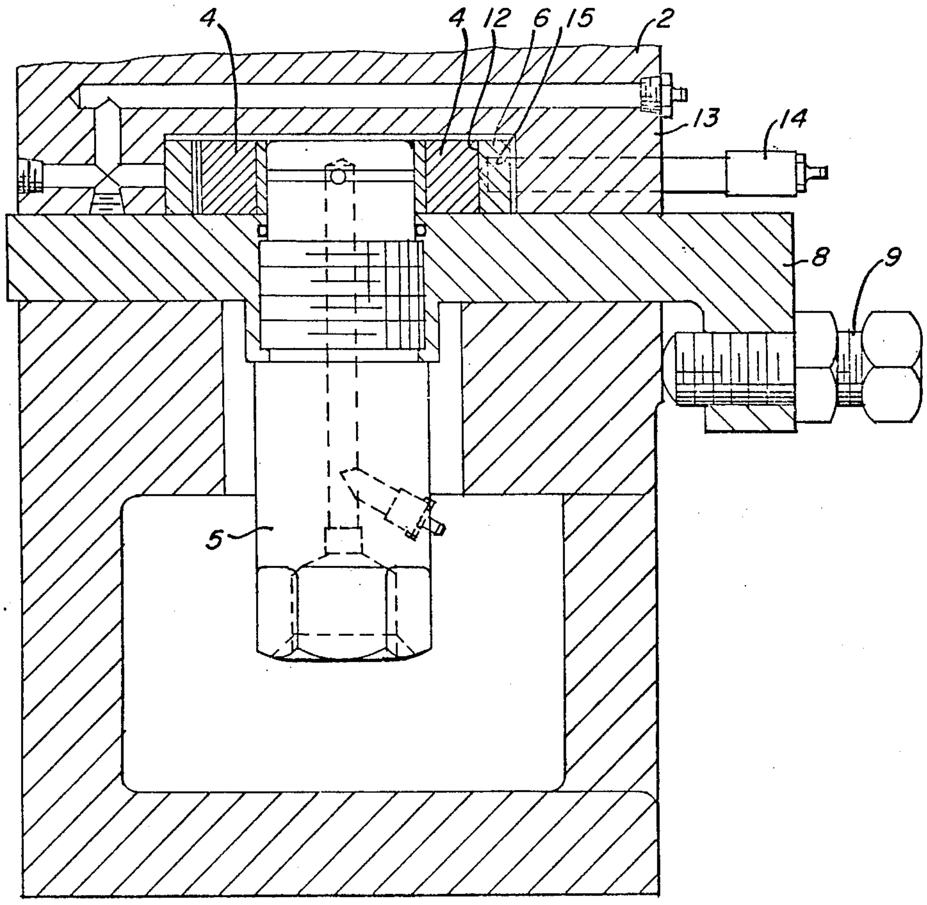
Figure 3:
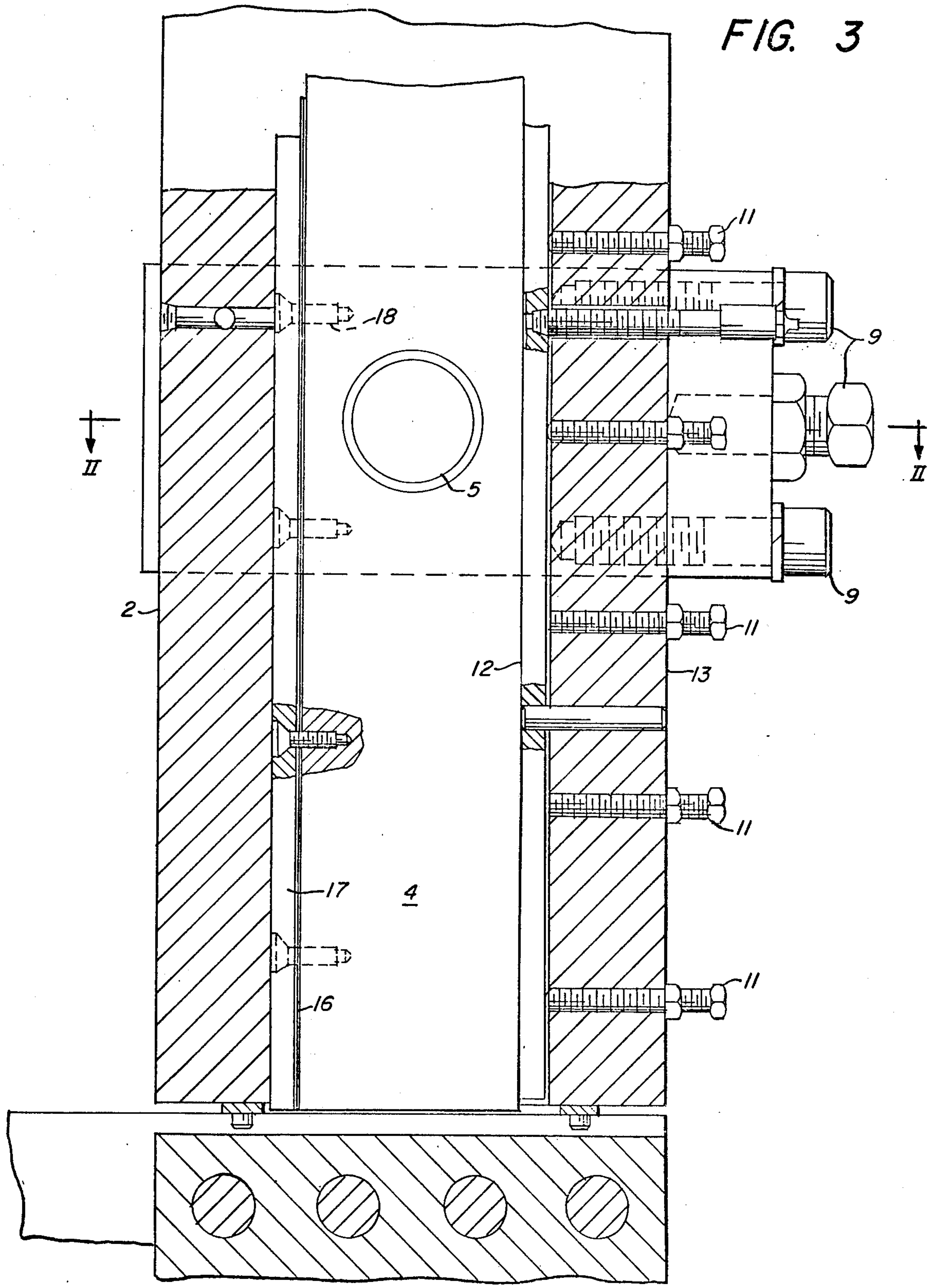

It will be described with more particularity with reference to the accompanying drawings, in which:

FIG. 1 is a more or less diagrammatic perspective view of the end of a mold roll and the guide device of my invention; and FIG. 2 is an end view of the guide device; and FIG. 3 is an overhead view thereof.

In FIG. 1, a mold roll support 1 is seen mounted in a fixed bearing block 2 having a slot-like recess 3. Positioned beneath the fixed bearing block 2 is the guide device, comprising a substantially horizontal guide block 4, a vertical pin 5, gib 6, and adjusting screws 9.

FIG. 2 displays a mounting plate 8 on which the guide block 4 rests. Through both the mounting plate 8 and guide block 4 passes the vertical pin 5, having threaded engagement with the mounting plate 8 but not with guide block 4. To the side of the mounting plate 8 is one of the adjusting screws 9 shown in contact with machine frame 10 forming part of the base of the machine.

The gib 6 is shown adjacent to the guide edge 12 of guide block 4. Passing through the wall 13 of the fixed bearing block 2 are at least two lugs 14 designed to fit into complimentary recesses 15 in said gib.

Referring now to FIG. 3, the bearing block 2, gib 6, guide block 4 having guide edge 12 may all be seen. More clearly seen also is an optional shim 16 and a shim holding plate 17, both on the side of the guide block opposite the adjustable gib 6. The screws 11 for adjusting gib (6) may be seen along the length of the fixed bearing block wall 13 and gib 6. Also seen are screws 18 which hold the shim 16 in place.

It will be seen that the position of the quite heavy fixed bearing block may be adjusted minutely through the oppositely acting screws 9. Moreover, the guide block 4 may be easily removed and the entire device easily reassembled, even while the mold roll is in place. The prior art device, which also employed a guide block and central pin (but with threads reversed) did not permit ready assembly and disassembly. The new elements which I have introduced, i.e. the mounting plate, adjusting screws therefor, the gib, and new pin configuration permit an ease of adjustment and assembly heretofore not possible.

Having thus described certain preferred embodiments of my invention, it should be clearly understood that the invention is not limited to the particular illustrations thereof but may be otherwise variously practiced within the scope of the following claims.

I claim:

1. An adjustable guide device for a roll-type briquetting machine comprising:

a. a substantially horizontal mounting plate having means for horizontal adjustment, b. a guide block on said mounting plate, having a substantially horizontal surface and a guide edge for alignment substantially perpendicular to the axis of a mold roll, c. a vertical pin having threads for engagement with and through said mounting plate and an unthreaded extension for passing through said guide block, d. a gib substantially parallel to said guide block and situated substantially adjacent to the guide edge thereof, and e. means for adjusting the position of said gib with respect to the guide edge of guide block.

2. The guide device of claim 1 including at least one shim adjacent to said guide block opposite the guide edge.

3. The guide device of claim 1 in which the means for horizontal adjustment of the mounting plate comprise at least two oppositely acting adjusting screws.

4. The device of claim 1 including lugs on the side of said fixed bearing block for fitting loosely into complimentary recesses in said gib.

* * * * *

UNITED STATES PATENT OFFICE

CERTIFICATE OF CORRECTION

Patent No. 3,982,866 Dated September 28, 1976

Inventor(s) William L. Lauterbach

It is certified that error appears in the above-identified patent and that said Letters Patent are hereby corrected as shown below:

Column 2, line 37, "and gib (6)" should be deleted.

Signed and Sealed this

Fourth Day of January 1977

[SEAL]

*Attest:*

RUTH C. MASON
*Attesting Officer*

C. MARSHALL DANN
*Commissioner of Patents and Trademarks*